US005346411A

United States Patent [19]

Nikkinen

[11] Patent Number: 5,346,411

[45] Date of Patent: Sep. 13, 1994

[54] TAP-IN BLADE FUSE

[76] Inventor: Kurt D. Nikkinen, 1374 Wynnewood Dr., West Palm Beach, Fla. 33417-5642

[21] Appl. No.: 165,191

[22] Filed: Dec. 13, 1993

[51] Int. Cl.[5] .......... H01M 85/22

[52] U.S. Cl. .......... 439/621; 337/255; 337/264

[58] Field of Search .......... 439/621, 622; 337/255, 337/264

[56] References Cited

U.S. PATENT DOCUMENTS

| | | | |
|---|---|---|---|
| 4,372,638 | 2/1983 | Sohler | 337/251 |
| 4,831,353 | 5/1989 | Gaia et al. | 337/225 |
| 4,884,050 | 11/1989 | Kozel | 337/264 |
| 4,944,697 | 7/1990 | Dorman | 439/621 |
| 5,139,443 | 8/1992 | Armando | 439/621 |
| 5,154,640 | 10/1992 | Chen et al. | 439/621 |

*Primary Examiner*—Gary F. Paumen

*Attorney, Agent, or Firm*—Oltman and Flynn

[57] ABSTRACT

A tap-in blade fuse is disclosed. A first embodiment comprises a plastic transparent body with two terminal blades on one side for use with an electrical fuse panel/-box in an automobile. The other side of the body has an accessory blade extending from the body with a through-hole in the the accessory blade for allowing a wire connection to pass through the hole for connection to automobile accessories. All the blades arc connected together with visible fuse links. A second embodiment further includes a panel shaped insulator which separates the fuse links within the body.

10 Claims, 1 Drawing Sheet

TAP-IN BLADE FUSE

This invention relates to fuses, and in particular to a tap-in blade fuse for use with automotive system applications.

BACKGROUND AND PRIOR ART

Existing fuse boxes and fuse panels in automobiles typically do not allow for an easy addition of auto accessories and equipment connections. Often auto owners would like to install accessories such as but not limited to compact disc players, cassette players, telephones, radios and televisions within their automobiles, vans or trucks. Modifying the boxes and panels has required extensive electrical modifications of the box and/or splicing of wires. These additions have further been time consuming and expensive. Further, these types of modifications can generally be dangerous and require trained personal to install any accessories Thus, it is an object of this invention to provide a convenient, easy, safe and reliable method for tapping a connection between an automobile's electrical power supply and added on accessories.

SUMMARY OF THE INVENTION

The first objective of the present invention is to provide an additional tap-in point for existing fuse boxes and panels by replacing an existing fuse with a tap-in fuse.

The second object of this invention is to permit users to add auto accessories and equipment connections without modifying or splicing wires to the fuse box or fuse panel.

The third object of this invention is to provide for adding auto accessories and equipment by making professional clean connections.

The fourth object of this invention is to to provide for adding auto accessories and equipment with a wire terminal with through hole therethrough.

A first embodiment tap-in blade fuse is disclosed which includes a plastic transparent body with two terminal blades on one side for use with an electrical fuse panel/box in an automobile. The other side of the body has an accessory blade extending from the body with a through-hole in the the accessory blade for allowing a wire connection to pass through the hole for connection to automobile accessories. All the blades are connected together with visible fuse links.

A second embodiment of the tap-n blade fuse includes all the features of the first embodiment and further includes a panel shaped insulator which separates the fuse links within the body.

Further objects and advantages of this invention will be apparent from the following detailed description of a presently preferred embodiment which is illustrated schematically in the accompanying drawings.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

First Preferred Embodiment

Figure 1:
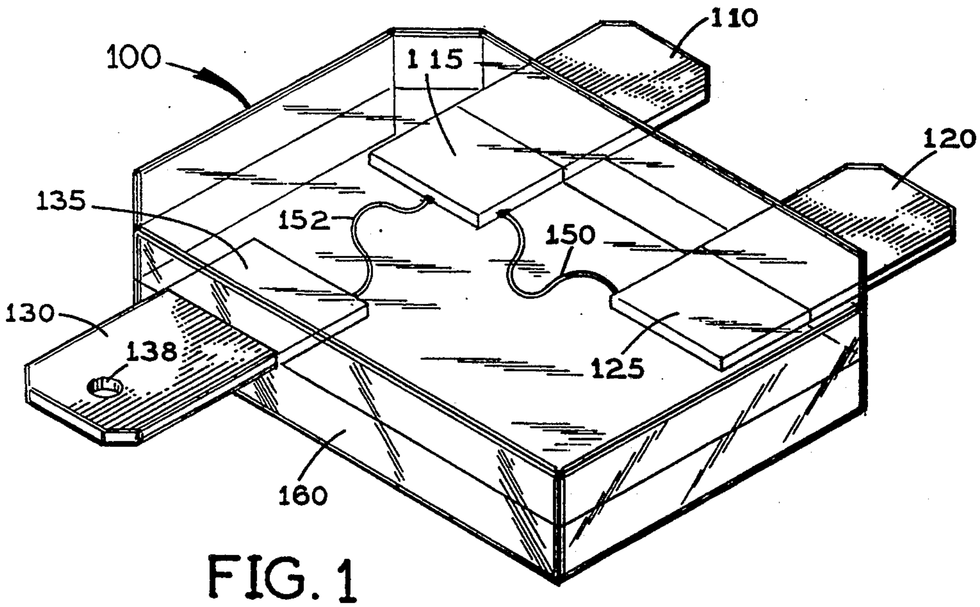
FIG. 1 illustrates a perceptive view of the first preferred embodiment of a tap-in blade fuse.

FIG. 1 illustrates a perceptive view of the first preferred embodiment 100 of a tap-in blade fuse. Terminal blades 110 and 120 have second ends 115 and 125 within a transparent housing 160. Terminal blades 110 and 120 can be made from conductive metal or the like. Housing body 160 can be molded from plastic or polystyrene or the like and generally exhibits insulation properties. Body 160 can initially be molded in two pieces that arc joined together in a parallel arrangement about the blades as shown in FIG. 1.

Fuse links 150 and 152 join blades 130, 110 and 120 to one another. The links 150 and 152 and blades 110, 120 and 130 can initially have been stamped from metallic or conductive material sheets. The size of the blades and the links are variable depending upon the amperage rating desired.

Operation of the tap-in fuse 100 will now be discussed. A typical blade fuse in an automobile fuse panel is replaced with the tap-in fuse 100, by plugging in the terminal blades 110 and 120 into the fuse panel. Accessory blade 130 will extend from the body 160 and will allow for wire connections in through-hole 138 to allow electrical accessories such as but not limited to compact disc players, cassette players, telephones, radios and televisions, to tap into the automobile's electrical power source. When fuse links 150 and 152 fail and separate due to an overload, the transparent body 160 will allow a visual inspection that the link(s) have split which necessitates replacing the fuse itself.

Second Preferred Embodiment

Figure 2:
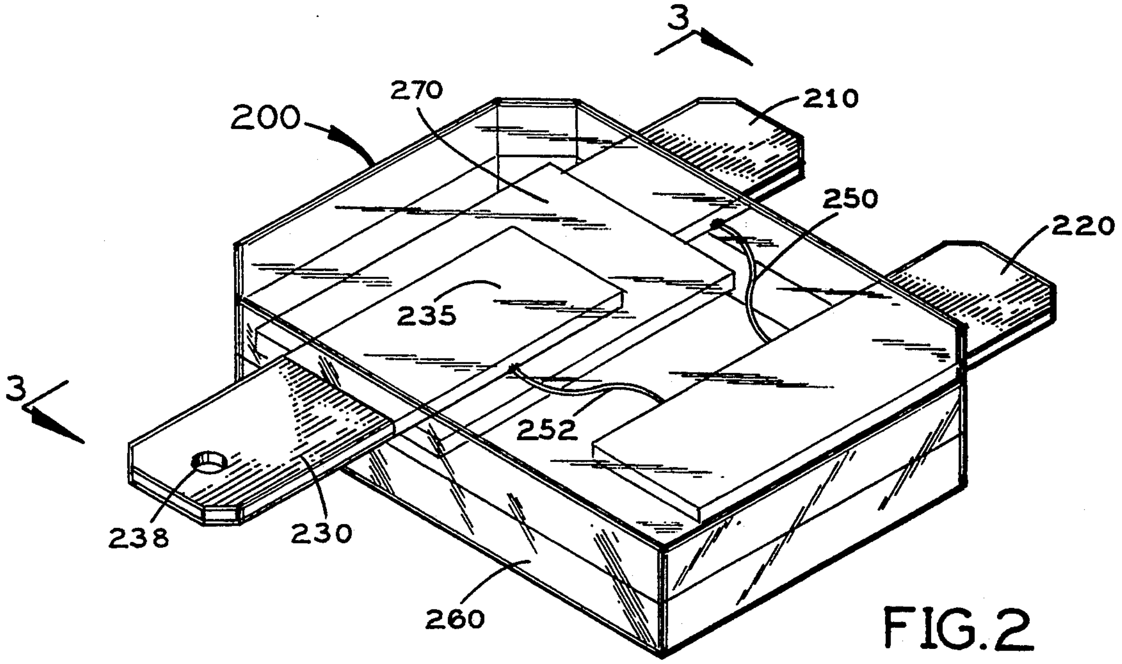
FIG. 2 illustrates a perceptive view of the second preferred embodiment of the tap-in blade fuse with an insulator panel between the fuse links.
Figure 3:
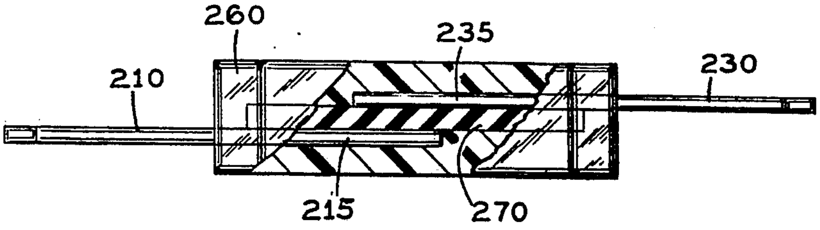
FIG. 3 illustrates a side view of FIG. 2 along arrow K.

FIG. 2 illustrates a perceptive view of the second preferred embodiment 200 of the tap-in blade fuse with an insulator panel between the fuse links. FIG. 3 illustrates a side view of the second preferred embodiment 200 of FIG. 2 along arrow K. Terminal blades 210 and 220 have second ends 215 and 225 within a transparent housing 160. Terminal blades 210 and 220 can be made from conductive metal or the like and can have a length within the body 260 which expands a substantial part of the distance along the width of the body 260. Similar to the first embodiment, the housing body 260 can be molded from plastic or polystyrene or the like and generally exhibits insulation properties. Body 260 can initially be molded together from two pieces that are joined together in a parallel arrangement about the blades as shown in FIG. 2.

Fuse links 250 and 252 join blades 230, 210 and 220 to one another. The links 250 and 252 and blades 210, 220 and 230 can initially have been stamped from metallic or conductive material sheets. The size of the blades and the links are variable depending upon the amperage rating desired. Also, the size of the housing is variable.

The second embodiment further includes a panel-shaped insulator 270 which can separate terminal blade 230 from accessory blade 210 as shown clearly in FIG.

3. Panel-shaped insulator 270 can help keep fuse link 252 from contacting terminal blade 210.

Operation of the tap-in fuse 200 is similar to that of the first embodiment. A typical blade fuse in an automobile fuse panel is replaced with the tap-in fuse 200, by plugging in the terminal blades 210 and 220 into the fuse panel. Accessory blade 230 will extend from the body 260 and will allow for wire connections in through-hole 238 to allow electrical accessories such as but not limited to compact disc players, cassette players, telephones, radios and televisions, to tap into the automobile's electrical power source. When fuse links 250 and 252 fail and separate due to an overload, the transparent body 260 will allow a visual inspection that the link(s) have split which necessitates replacing the fuse itself.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A tap-in blade fuse comprising:

terminal blades with one end within a housing and a second end for connection to an electrical panel;

an accessory blade with one end connected to the housing and a second end extending from the housing, wherein the second end includes a through-hole therethrough; and fuse links for connecting all the blades together.

2. The tap-in blade fuse of claim 1, wherein the fuse is for use with an automobile fuse panel.

3. The tap-in blade fuse of claim 1, wherein the housing further includes:

a transparent plastic body.

4. The tap-in blade fuse of claim 1, further comprising:

an insulator within the housing for insulating the fuse links from one another.

5. The tap-in blade fuse of claim 1, wherein the insulator further includes:

a panel shape.

6. The tap-in blade fuse of claim 1, wherein the accessory blade further includes:

locating the second end on an opposite side of the housing away from the terminal blades.

7. The tap-in blade fuse of claim 1, wherein the housing further includes:

a transparent plastic body for viewing all the fuse links.

8. A tap-in fuse comprising:

terminal blades each having one end within a housing and a second end for connection to an electrical panel;

an accessory blade with one end connected to the housing and a second end extending from the housing;

fuse links for connecting the blades to one another, and an insulator panel within the housing for insulating the fuse links from one another.

9. The tap-in blade fuse of claim 8, wherein the accessory blade further includes:

a through-hole on the second end.

10. The tap-in blade fuse of claim 8, wherein the fuse is for use with an automobile fuse panel.

* * * * *